United States Patent
Yanou et al.

(10) Patent No.: US 6,194,792 B1
(45) Date of Patent: Feb. 27, 2001

(54) CONTROLLER FOR AUTOMOBILE

(75) Inventors: Masayuki Yanou, Hyogo; Katsunori Matsumoto, Tokyo, both of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/319,225

(22) PCT Filed: Oct. 8, 1997

(86) PCT No.: PCT/JP97/03620

§ 371 Date: Jun. 3, 1999

§ 102(e) Date: Jun. 3, 1999

(87) PCT Pub. No.: WO99/17977

PCT Pub. Date: Apr. 15, 1999

(51) Int. Cl.[7] .................................................. B60L 1/00
(52) U.S. Cl. ........................ 307/10.1; 307/9.1; 307/109
(58) Field of Search .................... 307/10.1, 109, 307/9.1; 361/160, 194; 180/446; 335/136

(56) References Cited

U.S. PATENT DOCUMENTS 4,875,539 * 10/1989 Abukawa et al. ................... 180/79.1
5,142,435 * 8/1992 Baumgartner et al. .............. 361/160
5,187,631 * 2/1993 Baylac et al. ........................... 361/94
5,572,177 * 11/1996 Fujiwara ............................... 335/132

FOREIGN PATENT DOCUMENTS

| 6-27433 | 4/1994 | (JP) . |
| 6-270824 | 9/1994 | (JP) . |
| 7-101345 | 4/1995 | (JP) . |
| 8-91240 | 4/1996 | (JP) . |

* cited by examiner

*Primary Examiner*—Stephen W. Jackson
*Assistant Examiner*—Sharon Polk
(74) *Attorney, Agent, or Firm*—Sughrue, Mion, Zinn, Macpeak & Seas, PLLC

(57) ABSTRACT

A vehicle controller is provided for supplying a driving current to a large current load. A smoothing capacitor is previously charged to reduce the ripple component in an operating current. Thereafter, a relay contact is closed and the operating current is supplied to a load from a DC power unit. Thus, the rush current to the capacitor is reduced when supplying the operating current to the load through the relay contact. It is, therefore, possible to use a relay having a contact current capacity smaller than that of a conventional relay and requiring less cost and reduce the product cost.

5 Claims, 4 Drawing Sheets

CONTROLLER FOR AUTOMOBILE

TECHNICAL FIELD

The present invention reduces a rush current to a capacitor, that is, a rush current flowing through a relay contact by charging a smoothing capacitor for reducing ripple components in an operating current and thereafter, supplying the operating current to a load from a DC power unit by closing the relay contact when supplying the operating current to the load through the relay contact from the DC power unit.

BACKGROUND ART

An electric-power-steering controller is described below as a conventional vehicle controller. FIG. 4 is a circuit diagram showing the conventional electric-power-steering controller disclosed in, for example, Japanese Patent Application No. 5-64268, in which the controller is locally shown by a block diagram. In FIG. 4, symbol 40 denotes a motor for outputting an auxiliary torque to the steering wheel (not illustrated) of a vehicle and 41 denotes a battery for supplying a motor current IM for driving the motor 41.

Symbol 42 denotes a large-capacity (1,000 to 3,600 $\mu$F.) for absorbing the ripple component of the motor current IM, 43 denotes a shunt resistor for detecting the motor current IM, and 44 denotes a bridge circuit comprising a plurality of semiconductor switching devices (e.g. FETs) Q1 to Q4 for switching the motor current IM in accordance with the magnitude and direction of the auxiliary torque. Symbol 46 denotes a normally-open relay for supplying or cutting off the motor current IM according to necessity.

Symbol 47 denotes a driving circuit for driving the motor 40 through the bridge circuit 44 and moreover driving the relay 46 and 48 denotes motor-current detection means for detecting the motor current IM through an end of the shunt resistor 43. The driving circuit 47 and motor-current detection means 48 constitute the peripheral circuit element of a microcomputer to be described later.

Symbol 50 denotes a torque sensor for detecting the steering torque T of a steering wheel and 51 denotes a speed sensor for detecting the speed V of a vehicle.

Symbol 55 denotes a microcomputer (ECU) for computing the auxiliary torque in accordance with the steering torque T and vehicle speed V and moreover, generating a driving signal corresponding to the auxiliary torque by returning the motor current IM, which inputs a rotational direction command Do and current controlled variable $I_o$ for controlling the bridge circuit 44 to the driving circuit 47 as driving signals.

The microcomputer 55 is provided with motor current decision means 56 for generating the rotational direction command $D_o$ of the motor 40 and the motor current command Im corresponding to the auxiliary torque, subtraction means 57 for computing the current deviation $\Delta I$ between a motor current command Im and the motor current IM, and PID operation means 58 for computing correction values of P (proportion) term, I (integration) term, and D (differentiation) term from the current deviation $\Delta I$ and generating the current controlled variable $I_o$ corresponding to a PWM duty ratio.

Moreover, though not illustrated, the microcomputer 55 includes a publicly-known self-diagnostic function in addition to an A-D converter and PWM timer circuit, detects a trouble in the relay 46 or troubleshoots a system at the start of the system, and unless any trouble is detected, turns on the relay 46 to supply power to the bridge circuit. Furthermore, while the system operates, the microcomputer 55 always self-diagnoses whether the system normally operates. If a trouble occurs, the microcomputer 55 releases the relay 46 through the driving circuit 47 to cut off the motor current IM.

Then, operations of an electric-power-steering controller are described by referring to FIG. 4. The microcomputer 55 captures the steering torque T and vehicle speed V from the torque sensor 50 and speed sensor 51, feedback-inputs the motor current IM from the shunt resistor 43, and generates the rotational direction command $D_o$ of a power steering and the current controlled variable $I_o$ corresponding to the auxiliary torque value to output them to the driving circuit 47.

The driving circuit 47 closes the normally-open relay 46 under a steady driving state. However, when the rotational direction command $D_o$ and current controlled variable $I_o$ are input, the circuit 47 generates a PWM driving signal to apply the signal to the semiconductor switching devices Q1 to Q4 of the bridge circuit 44.

Thereby, the motor current IM is supplied to the motor 40 from the battery 41 through the relay 46, shunt resistor 43, and bridge circuit 44. The motor 40 is driven by the motor current IM to output a required amount of auxiliary torque in a required direction.

In this case, the motor current IM is detected through the shunt resistor 43 and motor-current detection means 48 and returned to the subtraction means 57 in the microcomputer 55 and thereby, controlled so as to coincide with the motor current command Im. Moreover, the motor current IM includes ripple components due to the switching operation of the bridge circuit 44 under PWM driving but it is smoothed and controlled by the large-capacity capacitor 42.

When this type of electric-power-steering controller is started, it performs troubleshooting and thereafter, turns on the relay 46 to supply a control current corresponding to the desired steering torque T to the motor as described above, and operates so as to output a required amount of auxiliary torque. However, because the capacitor 42 has a large capacity, an excessive rush current flows through the relay contact when the relay 46 is turned on. As a result, when the controller is repeatedly started, the contact is welded due to transition and the current supplied to the motor 40 cannot be cut off when a system trouble occurs.

In the case of the relay 46, however, the durability of the contact against the rush current becomes important when the controller is repeatedly started in addition to the fact of satisfying a desired maximum supply current. Thus, a relay having a higher current-supply performance is used as a countermeasure and thus, part costs increase and resultingly, the product cost increases.

In the case of a system requiring a large auxiliary torque, the control current further increases and the impedance must be reduced in order to reduce the heat produced by the capacitor 42 due to increase of a ripple current and thereby, the capacity increases. Therefore, the rush current further increases, and not only the cost increases but also a problem occurs that the reliability of the controller is deteriorated.

The present invention is made to improve the reliability of the controller and reduce the product cost and makes it possible to select a relay in accordance with a maximum control current value by reducing a rush current. Therefore, it is possible to use a relay having a cost lower than a conventional one, reduce the product cost, and improve the reliability.

DISCLOSURE OF THE INVENTION

The present invention is directed to a vehicle controller that includes a relay contact for outputting a driving current to a large current load by a DC power supply and controlling the current, a smoothing capacitor connected between the large-current load of the relay contact and the earth, and spare charging control means for charging the capacitor for a predetermined time before closing the relay contact.

The spare charging control means sets a spare charging voltage level for a capacitor to an optional and cuts off charging after charging a capacitor for a predetermined time.

The spare charging control means is constituted so as to not influence the charged voltage of a capacitor for deciding an abnormal state such as welding of a relay.

The spare charging control means starts the controller and simultaneously starts the operation of an internal constant-voltage circuit and then immediately starts capacitor charging.

BEST MODE FOR CARRYING OUT THE INVENTION

Embodiment 1

Figure 1:
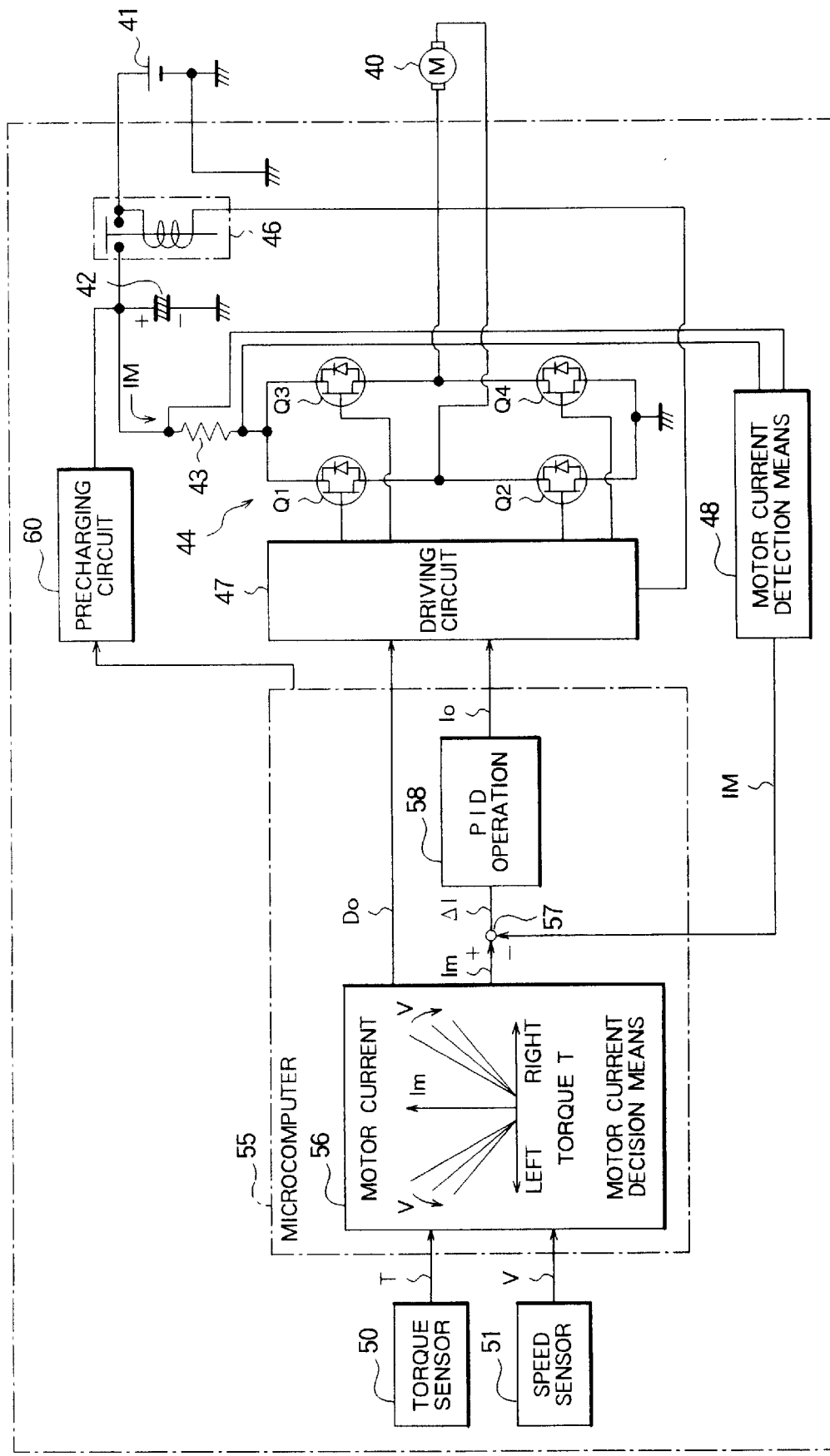
FIG. 1 is a block diagram of the electric-power-steering controller of an embodiment of the present invention.
Figure 4:
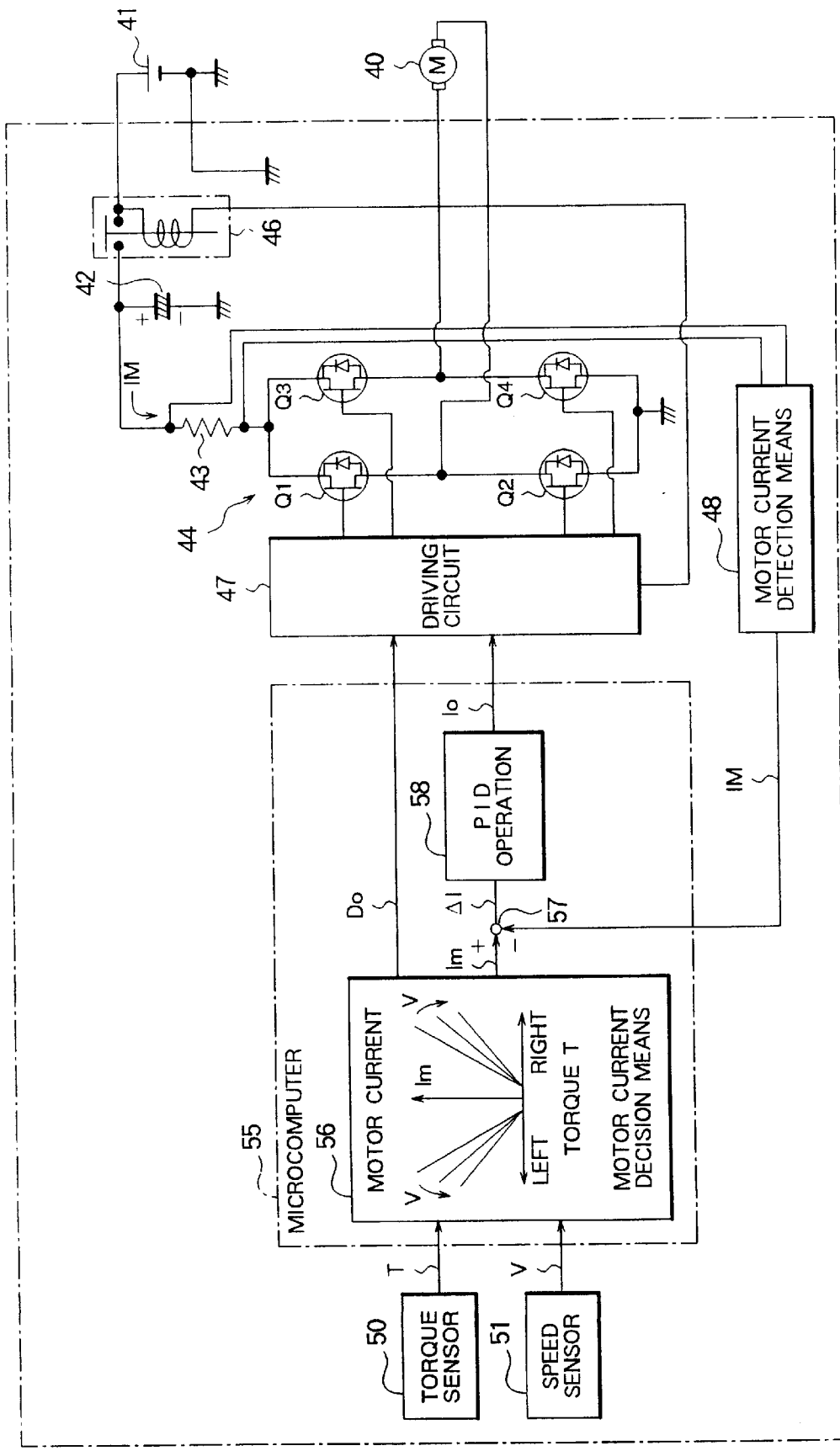
FIG. 4 is a block diagram of a conventional electric-power-steering controller.

The embodiment 1 of an electric-power-steering controller of the present invention is described below by referring to the accompanying drawings. FIG. 1 is a block diagram of-the electric-power-steering controller of this embodiment. In FIG. 1, a portion same as or corresponding to the portion in FIG. 4 is provided with the same symbol. In FIG. 1, symbol 60 denotes a precharging circuit. The precharging circuit 60 previously charges the capacitor 42 and then, stops charging the capacitor 42 in accordance with a control signal supplied from the microcomputer 55.

Figure 2:
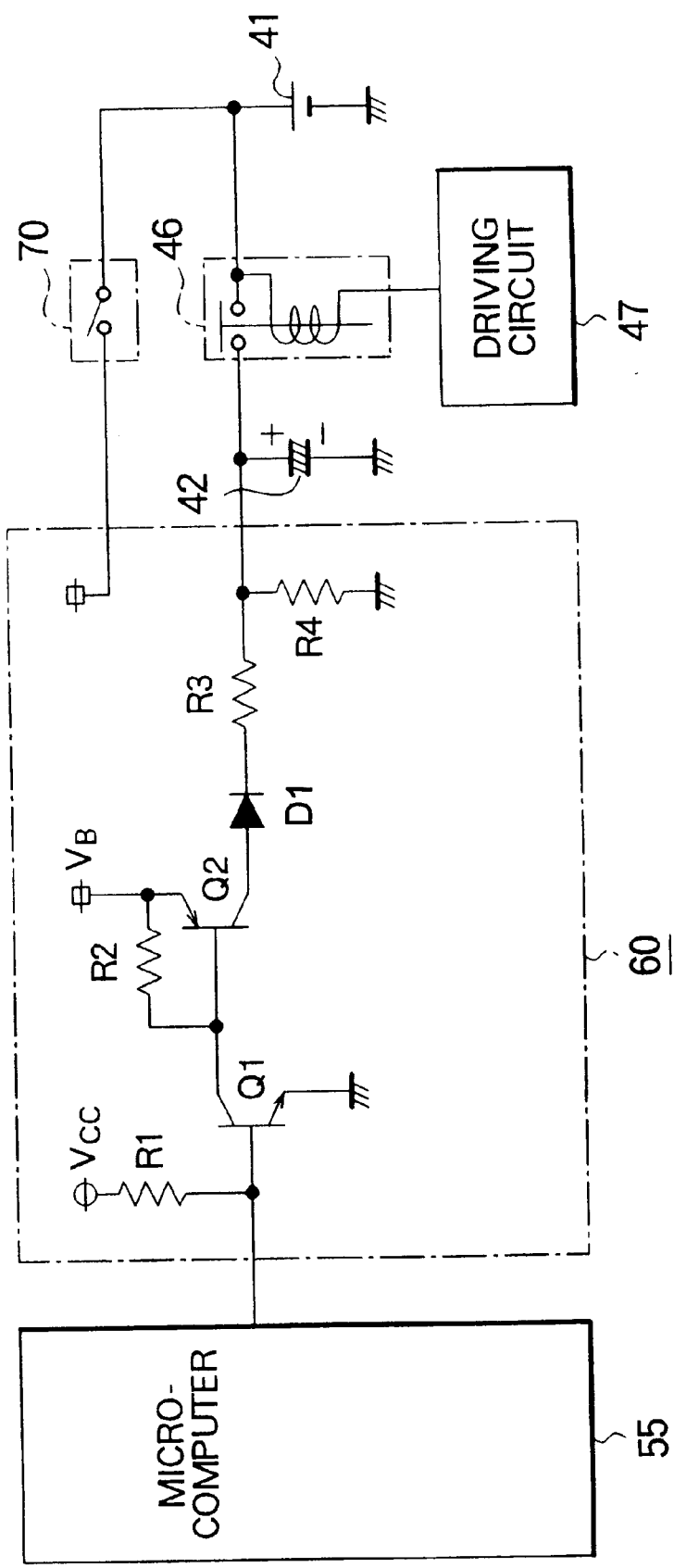
FIG. 2 is a precharging circuit of the electric-power-steering controller of the embodiment in FIG. 1.

As shown in FIG. 2, the precharging circuit 60 is constituted with an emitter-earthed transistor Q1 connecting with a resistance R1 whose base receives a control signal from the microcomputer 55 and which supplies a base current in accordance with a voltage Vcc, a power transistor Q2 whose base connects with the collector of the transistor Q1 and to whose emitter a battery voltage $V_B$ is applied by connecting a bias resistance R2 between the base and emitter, a reverse-withstand-voltage protective diode D1 whose anode is connected to the collector of the power transistor Q2, a resistance R3 connected between the cathode of the reverse-withstand-voltage protective diode D1 and the positive terminal of the capacitor 42, and a resistance R4 connected between the resistance R3, the connection side of the capacitor 42, and the earth.

The base of the transistor Q1 is connected with a control logic circuit at the microcomputer 55 side. When precharging is unnecessary, the control logic circuit supplies a signal becoming a minus level for the voltage Vcc to the base of the transistor Q1 to turn off the transistor Q1 by cutting off the base current and turn off the precharging circuit 60. To turn on the transistors Q1 and Q2 by supplying the voltages Vcc and $V_B$ to them and supply a charging current to the capacitor 42, the voltages Vcc and $V_B$ are respectively supplied to the transistors Q1 and Q2 through a not-illustrated constant-voltage circuit from the battery 41 by turning on an ignition key 70. When the voltage Vcc is supplied, the transistor Q1 is turned on and the voltage $V_B$ is generated between bias resistances R2. As a result, the base current is supplied to the power transistor Q2 to turn it on and thereby, the voltage $V_B$ is applied between the resistances R3 and R4 through the reverse-withstand-voltage protective diode D1. The voltage $V_B$ is divided at the resistance value ratio between the resistances R3 and R4 and applied to the both ends of the capacitor 42 by the resistance R4 and the capacitor 42 is charged. The power transistor Q2 is protected from the charging voltage of the capacitor 42 by the reverse-withstand-voltage protective diode D1. Because the charging voltage level of the capacitor 42 can be set to any value in accordance with the ratio between the resistances R3 and R4, it is possible to easily set a charging voltage level so that the level is equal to or lower than a system-trouble detection voltage level and the rush-current prevention effect is improved as high as possible.

Figure 3:
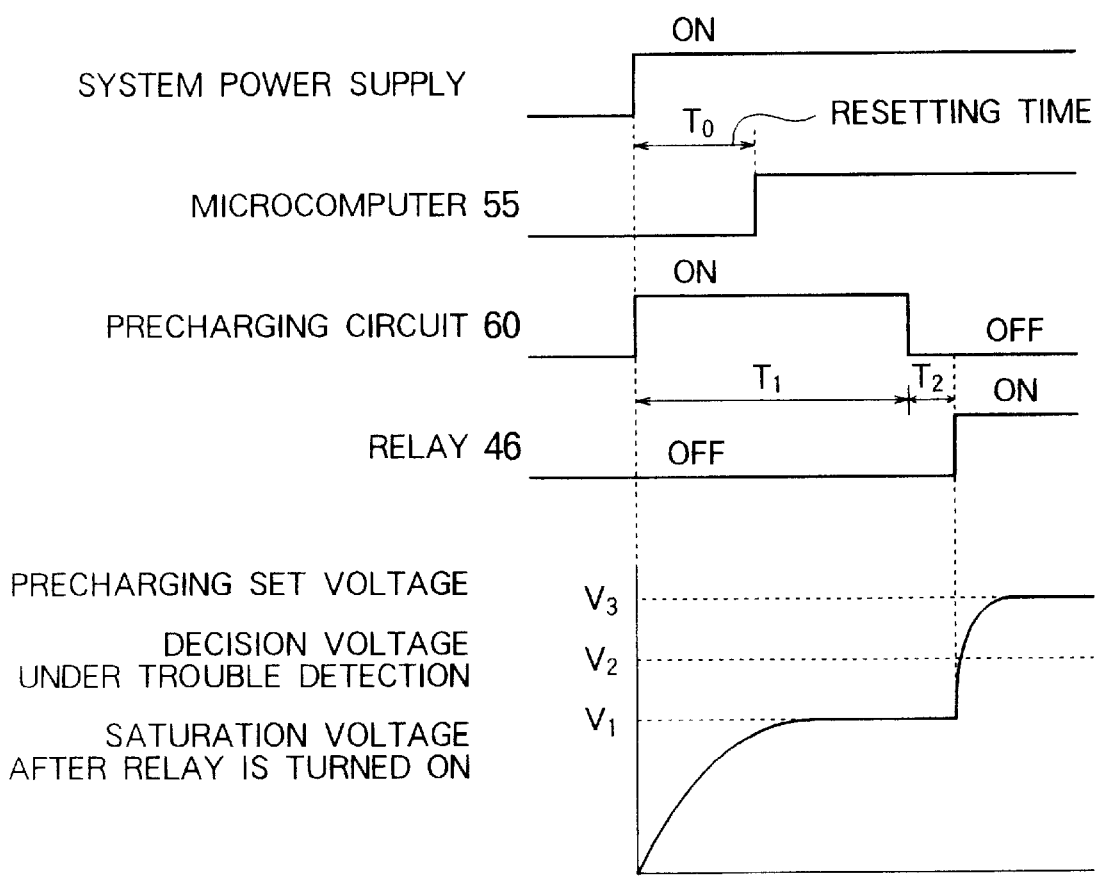
FIG. 3 is a timing chart showing the operation at the start of the system of the electric-power-steering controller of the embodiment in FIG. 1.

Then, operations of the precharging circuit 60 at the start of the controller is described below by referring to FIG. 3. FIG. 3 is a timing chart showing operations of an electric-power-steering controller at the start of the system. In FIG. 3, T0 denotes a time for resetting the microcomputer 55, T1 denotes a time for precharging the capacitor 42, T2 denotes a time for detecting a system trouble by the microcomputer 55 after precharging is completed, V1 denotes a voltage for setting precharging, V2 denotes a voltage for deciding a trouble such as relay welding, and V3 denotes a saturation voltage of the capacitor 42 after the relay 46 is turned on.

In the case of the electric-power-steering controller taking a vehicle controller as an example, it is necessary to minimize the time until the system operates after the ignition key 70 is turned on.

In the case of the precharging circuit 60 of this embodiment, a not-illustrated constant-voltage circuit starts at the same time when the system is started because the ignition key 70 is turned on, and voltages of the battery 41 are set to the voltages Vcc and $V_B$ which are supplied to the transistors Q1 and Q2 and the microcomputer 55 as the system power supply by stabilizing the voltages Vcc and $V_B$ to the power supply voltage of the microcomputer.

The transistors Q1 and Q2 are turned on when the voltages Vcc and $V_B$ are supplied and moreover, the microcomputer 55 starts operation. Moreover, the capacitor 42 is charged because a divided voltage of the voltage $V_B$ determined by the resistance value ratio between the resistances R3 and R4 is applied. Therefore, the time for precharging the capacitor 42 is decreased compared to the case in which the charging is performed after the time T0 for resetting the microcomputer 55.

Then, the microcomputer 55 applies a signal becoming a minus level for the voltage Vcc to the base of the transistor Q1 after the precharging time T1 becoming the charging set voltage V1 set at the resistance value ratio between the resistances R3 and R4 to cut off the base current and operationally cuts off the precharging circuit 60 from the capacitor 42 by turning off the transistors Q1 and Q2.

Then, the microcomputer 55 troubleshoots the relay 46 for the following trouble detection time T2. When the relay 46 is normal, the microcomputer 55 operates the driving circuit 47 to turn on the relay 46. Because the capacitor 42 is already charged up to the precharging set voltage V1, it is possible to greatly reduce the rush current from the battery 41 to the capacitor 42 generated when the relay 46 is further charged by the battery 41 up to the saturation voltage V3 after the relay 46 is turned on, that is, the contact current of the relay 46.

When the relay 46 is closed due to contact welding or a trouble of the driving circuit 47, the relay 46 is turned on independently of whether the system power supply is turned on or off in the former case and the capacitor 42 is kept at a charged state up to the saturation voltage V3.

In the latter case, however, the capacitor 42 is charged up to the saturation voltage V3 through the contact of the relay 46 by the battery 41 when the system is turned on. In any case, the capacitor 42 is charged up to the saturation voltage V3 independently of the set voltage V1 of the precharging circuit by the diode D1. Therefore, troubleshooting is securely performed.

Moreover, because leakage of a voltage from the charged capacitor 42 to an internal circuit is cut off when the contact of the relay 46 is welded and the system power supply is turned off, the system does not malfunction even if a trouble occurs.

Moreover, the precharging circuit stops charging the capacitor 42 the predetermined time T1 after the system is started by the microcomputer 55 as described above. Therefore, even if a trouble is detected through troubleshooting while the system operates, the relay 46 is immediately turned off, and the power supply from the battery 41 to the bridge circuit 44 is cut off so that a driving voltage does not leak from the precharging circuit 60 to the bridge circuit 44.

As described above, the present invention makes it possible to reduce a rush current from a capacitor to a relay contact by a relatively simple circuit not deteriorating the original operation of a system and improve the reliability of a controller.

Industrial Applicability

By previously charging a smoothing capacitor for reducing the ripple component in an operating current and thereafter, closing a relay contact and supplying the operating current to a load from a DC power unit and thereby, reducing the rush current to the capacitor when supplying the operating current to the load through the relay contact from the DC power unit, it is possible to use a relay having a contact current capacity smaller than that of a conventional relay and requiring less cost and reduce the product cost.

What is claimed is:

1. A vehicle controller comprising:
    a relay contact for controlling and outputting a driving current to a load from a power supply;
    a capacitor connected between said relay contact and the earth such that said capacitor can be charged to a fully charged voltage by said power supply through said relay contact;
    control means for precharging said capacitor to a predetermined precharged voltage before closing said relay contact; and
    fault detecting means for detecting an abnormal state of said relay contact when said capacitor is precharged to a voltage which is greater than a predetermined threshold lying between said fully charged voltage and said predetermined precharged voltage.

2. The vehicle controller according to claim 1, wherein said predetermined precharged voltage for said capacitor can be set to an optional value.

3. The vehicle controller according to claim 1, wherein said control means precharges said capacitor for a predetermined time and thereafter, cuts off precharging.

4. The vehicle controller according to claim 1, wherein said control means is constructed such that it does not influence a precharging voltage of said capacitor, where said precharging voltage is used in determining an abnormal state when said relay contact is welded.

5. The vehicle controller according to claim 1, wherein said control means starts an operation of an internal constant voltage circuit upon start of said controller and immediately starts precharging said capacitor.

* * * * *